United States Patent [19]

Blankenship

[11] Patent Number: 5,304,780
[45] Date of Patent: Apr. 19, 1994

[54] INCINERATOR TOILET, ASH PAN AND CONTROL CIRCUIT

[75] Inventor: Ernest B. Blankenship, Dallas, Tex.

[73] Assignee: Research Products/Blankenship Corp., Dallas, Tex.

[21] Appl. No.: 942,762

[22] Filed: Sep. 9, 1992

Related U.S. Application Data

[60] Division of Ser. No. 659,827, Feb. 22, 1991, Pat. No. 5,153,942, which is a continuation-in-part of Ser. No. 643,784, Jan. 22, 1991, Pat. No. 5,123,122.

[51] Int. Cl.$^5$ .......................... A47K 11/02; H05B 1/02
[52] U.S. Cl. ...................... 219/492; 392/379; 4/111.5; 110/250
[58] Field of Search ............. 219/492; 392/379, 383; 4/111.5, 111.1, 111.2; 110/250, 241

[56] References Cited

U.S. PATENT DOCUMENTS

| | | | |
|---|---|---|---|
| 2,771,533 | 11/1956 | Osberg et al. | 4/111.5 |
| 3,251,070 | 5/1966 | Blankenship | 4/111.5 |
| 3,435,247 | 3/1969 | Pfeiffer | 219/492 |
| 3,765,475 | 10/1973 | Hooper | 165/80 |
| 4,162,656 | 7/1979 | Dallen et al. | 4/111.1 |
| 4,642,441 | 2/1987 | Kenyon | 219/501 |
| 4,665,630 | 5/1987 | Postbechild | 34/202 |
| 4,823,408 | 4/1989 | Blankenship | 4/111.5 |
| 4,916,287 | 4/1990 | Soden et al. | 219/492 |
| 5,012,070 | 4/1991 | Reed | 219/202 |
| 5,163,234 | 11/1992 | Tsukamoto et al. | 392/380 |
| 5,218,724 | 6/1993 | Blankenship | 4/111.5 |

Primary Examiner—Bruce A. Reynolds
Assistant Examiner—John A. Jeffery
Attorney, Agent, or Firm—Arthur F. Zobal

[57] ABSTRACT

A partially cylindrical shaped inner wall forming an arc less than 360 is secured to the inner cylindrical shaped side wall of the toilet outward of the electrical heater coil forming an enclosed inner heat insulation holding space for receiving heat insulation. An ash pan has inner and outer stainless steel pans with their upper ends secured together forming an enclosed space in which are located a copper pan against the inner pan and heat insulation material. An electrical circuit is provided having a timer for controlling the exhaust fan motor and a timer for controlling a temperature controller which drives a relay which is connected to the heater coil. A thermocouple located in the enclosed space in the ash pan is coupled to the circuit for shutting the heater down when the temperature in the bottom of the ash pan reaches a predetermined value.

2 Claims, 12 Drawing Sheets

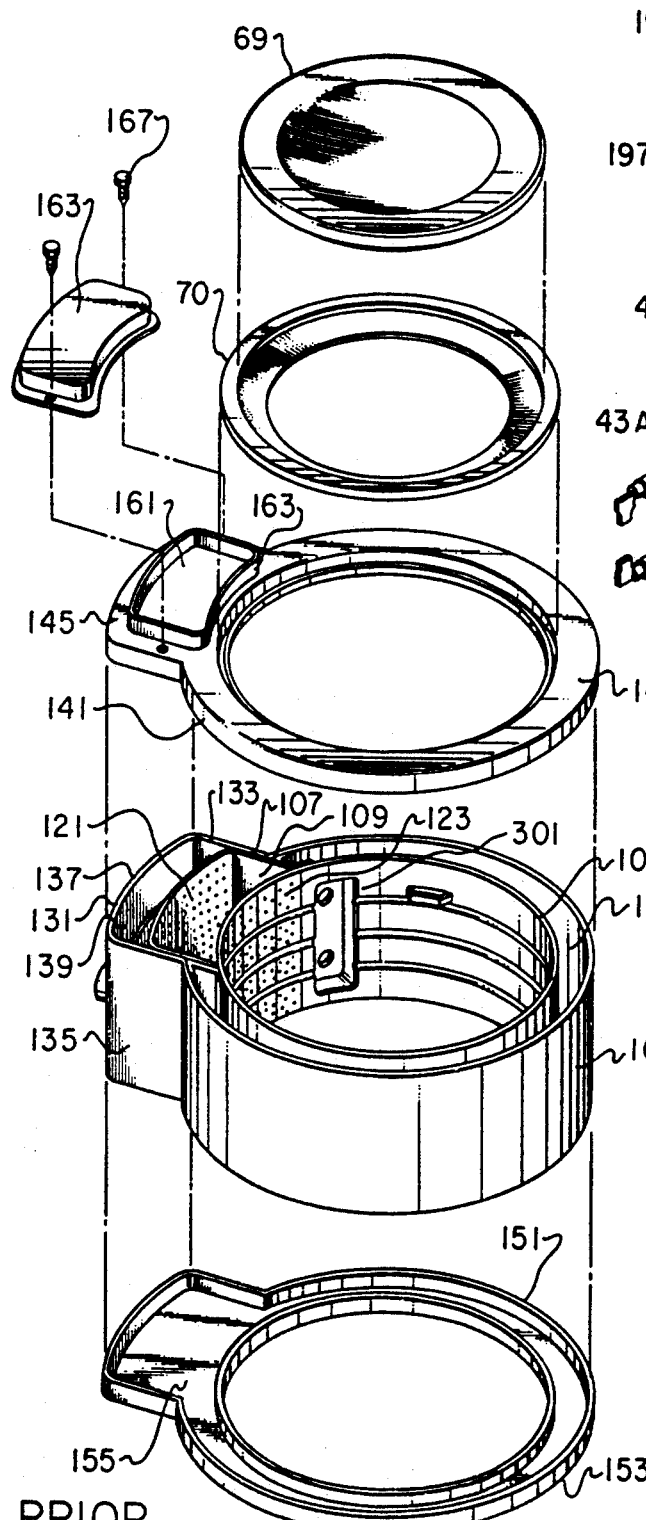
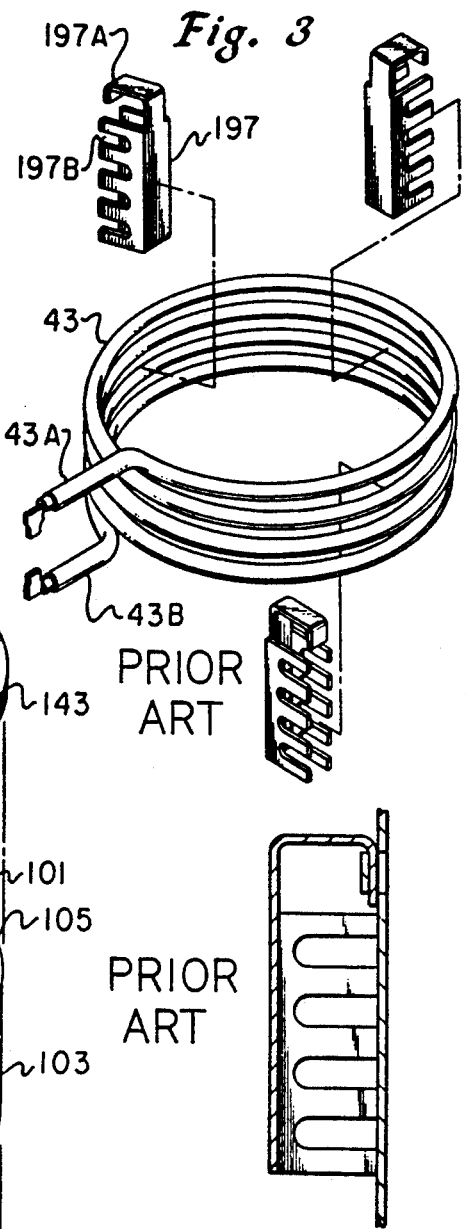
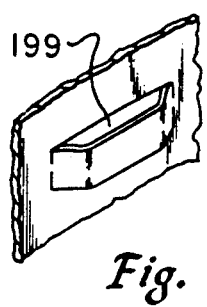
Fig. 2 PRIOR ART
Fig. 3 PRIOR ART
Fig. 5 PRIOR ART
Fig. 6 PRIOR ART

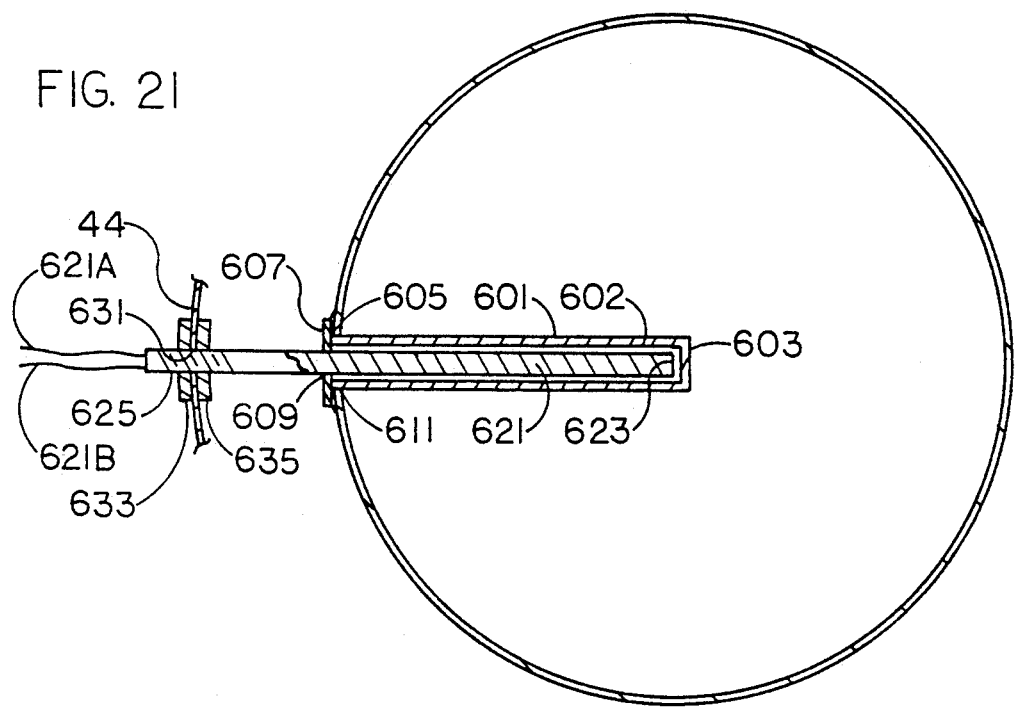
FIG. 21
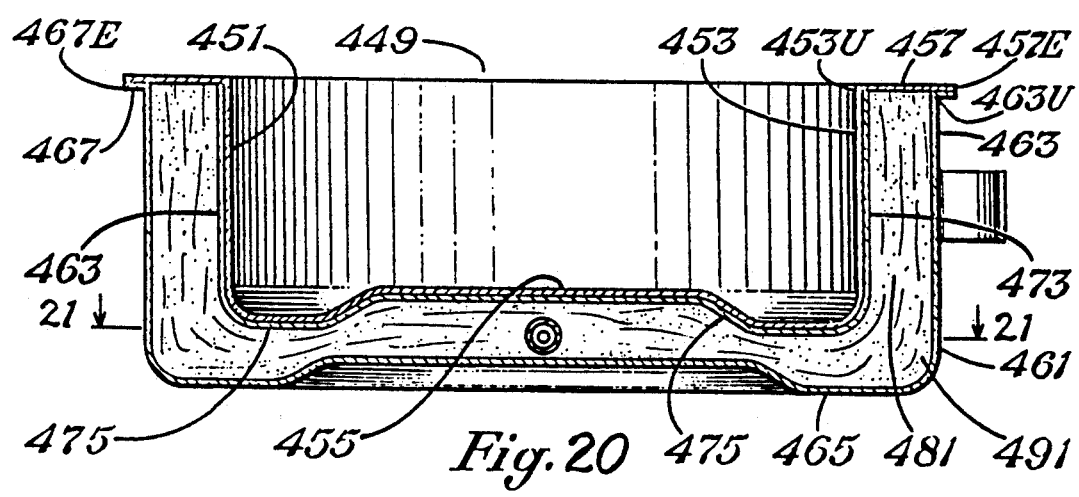

INCINERATOR TOILET, ASH PAN AND CONTROL CIRCUIT

This application is a divisional of U.S. patent application Ser. No. 07/659,827, filed Feb. 22, 1991 now U.S. Pat. No. 5,153,942 which is a continuation-in-part of U.S. patent application Ser. No. 07/643,784, filed Jan. 22, 1991, now U.S. Pat. No. 5,123,122.

BACKGROUND OF THE INVENTION

U.S. Pat. Nos. 4,823,408 and 4,905,324, disclose a useful electrically actuated incinerator toilet and useful ash pans for use with the incinerator toilet.

Higher efficiency in the use of electrical energy produced by the electric heater of an electrically actuated incinerator toilet is needed in order to reduce the time of incineration or to increase the rate of incineration and hence the capacity of the toilet for reducing the cost of operation, i.e. kilowatt consumption.

Greater efficiency can be obtained by reducing the volume of the incinerator chamber, particularly the space immediately surrounding the heater. If all heaters were of the same wattage and hence the same coil diameter, then the inner wall of the chamber directly facing the heater could be assigned a fixed, best size diameter. Since however, heaters do vary in wattage, depending upon the application, as do the diameters of the heaters, a means is needed to accommodate the varying diameters accompanied by the minimization of space immediately behind the heater coil.

Better efficiency also can be achieved by improving the efficiency of the ash pan.

An ash pan formed by an aluminium insert placed into a stainless steel pan has advantages but is also has been found to have several shortcomings.

Aluminum has a melting point around 1170 deg F but begins to soften at considerably lower temperatures with the result that the sides of the insert under certain conditions can sag and rupture at operating temperatures of the incinerator; in particular, hot spots can develop immediately beneath waste matter which is burning (exothermic). There tends to be corrosion also at the higher temperatures. The overall result is that the aluminum inserts have to be replaced too often.

Aluminum has a relatively high coefficient for heat conduction, i.e. around 0.5 units as compared to stainless steel having a coefficient for heat conduction of about 0.1 units. Copper has the highest coefficient of heat conduction of commonly available material: 1.0 units. Clearly, if the objective is to provide means to pick up heat from side portions of the insert and conduct it to the bottom section underneath the waste, then copper would be much better than aluminum (1.0 to 0.5); however, copper oxidizes rapidly at the temperatures expected during the incineration process. Furthermore, copper is soft and cannot take the physical abuse associated with cleaning and handling of the ash pan during routine maintenance of the toilet.

SUMMARY OF THE INVENTION

It is an object of the invention to provide a more efficient electrical incinerator toilet and ash pan.

It is another object of the invention to provide a more effective and efficient electrical circuit for operating and controlling the electrical blower fan and the electrical heater coil of an electrical incinerator toilet.

The incinerator toilet comprises an incinerator chamber having inner cylindrical shaped side wall with an upper end and a lower end with a central opening extending therethrough. An electrical coil heating means is located in the central opening and spaced inward from the inner cylindrical side wall. A partially cylindrical shaped inner wall forming an arc less than 360 is provided to be secured to the inner cylindrical shaped side wall outward of the electrical coil forming an enclosed inner insulation holding space for receiving heat insulation material.

Preferably the inner cylindrical shaped side wall is constructed to have a maximum diameter of that associated with the maximum heater size; i.e. wattage, and the partially cylindrical shaped inner wall will have a diameter depending upon heaters of lesser wattage and size.

The partially cylindrical shaped inner wall is located such that its spaced apart ends straddle the perforations formed through the inner cylindrical shaped inner side wall to accommodate the egress of odor through the perforations, the odor control catalyst pellets and hence to atmosphere.

The ash pan comprises inner and outer stainless steel pans with the upper end of the inner pan having a flange extending radially outward therefrom which is secured to upper end of the outer pan forming an enclosed space between the sides and bottoms of the two pans. An intermediate copper pan is located in the enclosed space against the bottom of the inner pan and heat insulation material is located in the enclosed space between the intermediate and outer pans. The inner pan directly accepts the waste for incineration and provides a tough surface for protection against ordinary maintenance requirements. The heat insulation material insulates the outer pan from the inner and intermediate pans and significantly increases the efficiency of the system and reduces the temperature present on the outer shell of the toilet making it more comfortable to the touch. The enclosed space may be filled with an inert gas or a vacuum provided to eliminate or minimize oxidation of the copper at high temperatures.

In accordance with another aspect of the invention a more efficient and effective circuit is provided for operating and controlling the blower fan and heater coil. A prior circuit employed a single timer that drives a double pole relay, one pole of which controls the blower and the other pole of which controls the heater. The blower stays on for a period after the timer times out since it is part of a parallel circuit. Two thermostats are provided which are located at a distance from the heater. One thermostat controls the heater and the other thermostat controls the blower inversely so that it closes upon the rise of temperature and maintains the blower on longer than the heater. Although this prior circuit is useful, it is not as effective as desired and the thermostats are relatively insensitive and allow the heater to overheat limiting it life.

Experience has shown that the best incineration takes place at heater surface temperatures above 1200 F.; however, if heater surface temperature exceeds about 1500 F., heater failure rate increases significantly. Control means is necessary to maintain the heater surface temperature between 1200 F. and 1400 F. This is easily done using a standard thermocouple-controller. If the thermocouple is located against or close to the heater surface, surface temperature can be controlled closely.

The circuit of the present invention comprises a first timer for controlling the blower fan and a second timer for controlling the heater by way of a heat controller-thermocouple, and a relay. The first timer times out after the second timer and the thermocouple controls the heat controller.

In another aspect, a selector switch is provided for controlling the second timer. It may be moved to first, second, and third positions for terminating the output of the second timer; for increasing its timing interval; and for decreasing its timing interval respectively.

In a further aspect a second thermocouple is provided for sensing the temperature of the ash pan and for shutting down the heater when the temperature of the ash pan reaches a predetermined value.

BRIEF DESCRIPTION OF THE DRAWINGS

FIGS. 1–12 illustrate the incinerator toilet and ash pans of U.S. Pat. Nos. 4,823,408 and 4,905,324.

FIG. 1 is a cross sectional side view of the incinerator toilet.

FIG. 2 is an exploded view of an incinerator chamber member of the toilet.

FIG. 3 is an exploded view of the electrical heating coil and its supporting brackets employed in the incinerator chamber member of FIGS. 1 and 2.

FIG. 4 is a cross section of FIG. 1 taken along the lines 4—4 thereof.

FIG. 5 is a side view of one of the brackets employed for securing the electrical coil within the incinerator chamber member.

FIG. 6 illustrates a slot formed in the inner wall of the incinerator chamber member in which the upper hook of the bracket of FIG. 5 may be inserted for holding the bracket in place.

FIG. 7 is a cross sectional view of FIG. 4 taken along the lines 7—7 thereof.

FIG. 8 is a cross sectional view of FIG. 4 taken along the lines 8—8 thereof.

FIG. 9 is an exploded view of a removable ash pan employed in the toilet of FIG. 1.

FIG. 10 is a partial cross sectional side view of the toilet of FIG. 1 illustrating that the ash pan is removable.

FIG. 11 is an exploded view of another embodiment of an ash pan of the toilet.

FIG. 12 is a partial cross sectional side view of the toilet of FIG. 1 illustrating the removable ash pan of FIG. 11 located therein.

FIG. 20 is a cross section of the ash pan of FIG. 16, but with a thermocouple located between the copper pan and the outer steel pan.

FIG. 21 is a cross section of FIG. 21 taken along lines 21—21 thereof. The heat insulation is not shown in FIG. 21.

DESCRIPTION OF THE INCINERATOR TOILET AND ASH PAN OF U.S. Pat. Nos. 4,823,408 AND 4,905,324

Figure 1:
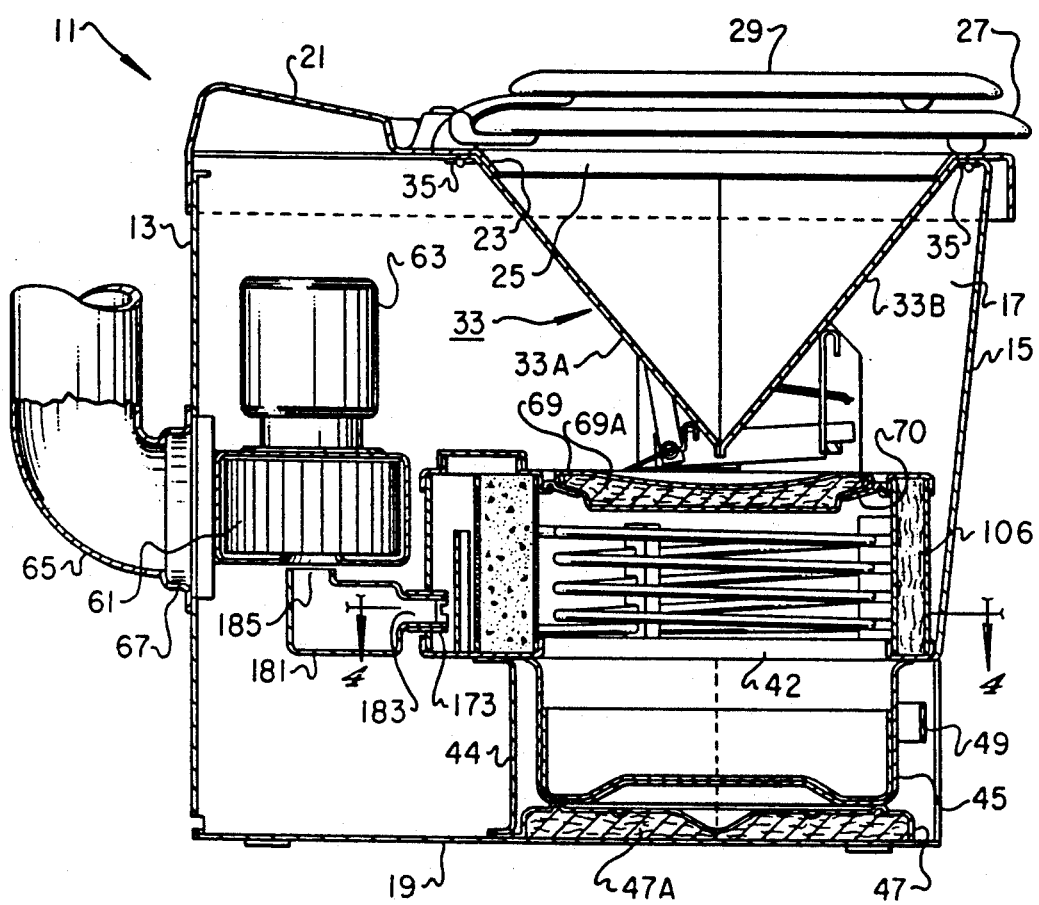

Referring to FIG. 1, the incinerator toilet comprises a housing 11 formed by a rear wall 13, a front wall 15, two side walls, one of which is identified at 17, a bottom wall 19, and a top 21. The front, rear, sides, and bottom walls and the top 21 are preferably formed of mild steel. The forward portion of the top 21 includes a recessed upper bowl portion 23 forming an upper opening 25 which extends downward from the top 21. Located above and around the bowl 23 is a hinged seat 27 adapted to be located in the position shown or moved to an upward position. A hinged lid 29 is adapted to fit over the seat 27. The lid 29 also may be moved to an upward position independently of the seat. The seat 27 and the lid 29 are hinged to the top 21 by way of a hinge arrangement illustrated at 31. A lower bowl portion 33 is located below the upper bowl portion 23 and is transversely divided into two halves 33A and 33B which are pivotally mounted to the underside of the top 21 by way of hinges 35. When the toilet is being used, the halves 33A and 33B will be in their closed position whereby a cone-shaped paper insert may be located within the lower bowl portion 33.

The incinerator toilet comprises an open ended incinerator chamber member 41 located below the bowl and which has a circular electrical heating coil 43 located in its central opening 42. The chamber member 41 is mounted on a semi-circular metal support 44. An ash pan 45 is slideably mounted on a metal step support 47 formed on the housing bottom 19 within the chamber support 44 and below the central opening 42 of the chamber member 41. Heat insulation materials 47A is located between the support 47 and the bottom 19. The ash pan 45 has a handle 49 on its front side which is accessible by means of a removable panel (not shown) but which will be located below the front wall 15. A blower wheel 61 and a motor 63 are provided for drawing gases from the interior of the chamber 41 and the pan 45 and then through a heat activated odor reducing catalyst 81 and then out of a rear vent 65 which is connected to the rear wall 13 of the housing by way of a collar 67. An incinerator chamber lid 69, which fits into a recessed seat 70 formed at the upper end of the chamber 41, is provided for closing the upper end of the chamber 41 while the heater coil 43 is being energized for disposing of the waste received in the pan 45. The outer walls of the lid 69 are formed of stainless steel with heat insulation material 69A located within the walls.

When the incinerator toilet is being used by a person, the lower bowl halves 33A and 33B will be located in their closed position as shown in FIG. 1 and a cone-shaped paper insert located within the lower bowl portion 33. When it is desired to deposit the waste in the paper cone within the pan 45, the chamber lid 69 will raised upward and out of its recessed seat and then swung to the side and out of the way to allow the hinged halves 33A and 33B to swing open to allow the paper cone and the waste to drop through the central opening 42 of the chamber 41 and into the pan 45. A linkage mechanism controlled by a foot pedal suitable for allowing the bowl halves 33A and 33B and the chamber lid 69 to operate in this manner is disclosed in U.S. Pat. No. 3,890,653, granted on Jun. 24, 1975, and entitled "Incinerator Toilet Having A Vertically Movable Incinerator Chamber Lid". After the paper cone and waste have been deposited in the pan 45, the foot pedal again will be actuated to return the chamber lid 69 to its closed position and to return the bowl halves 33A and 33B to their closed positions. A switch then may be actuated to complete a circuit to the electrical coil 43 and to the blower motor 63. A timer is set thereby causing the heater and exhaust blower to come into operation, staying on until the incinerator process and cooling process are completed. Gases from the chamber 41 are drawn through the heat activated catalyst 81 for reducing the odor and then through the ventline 65. Residual ash is collected in the removable ash pan 45.

Figure 4:
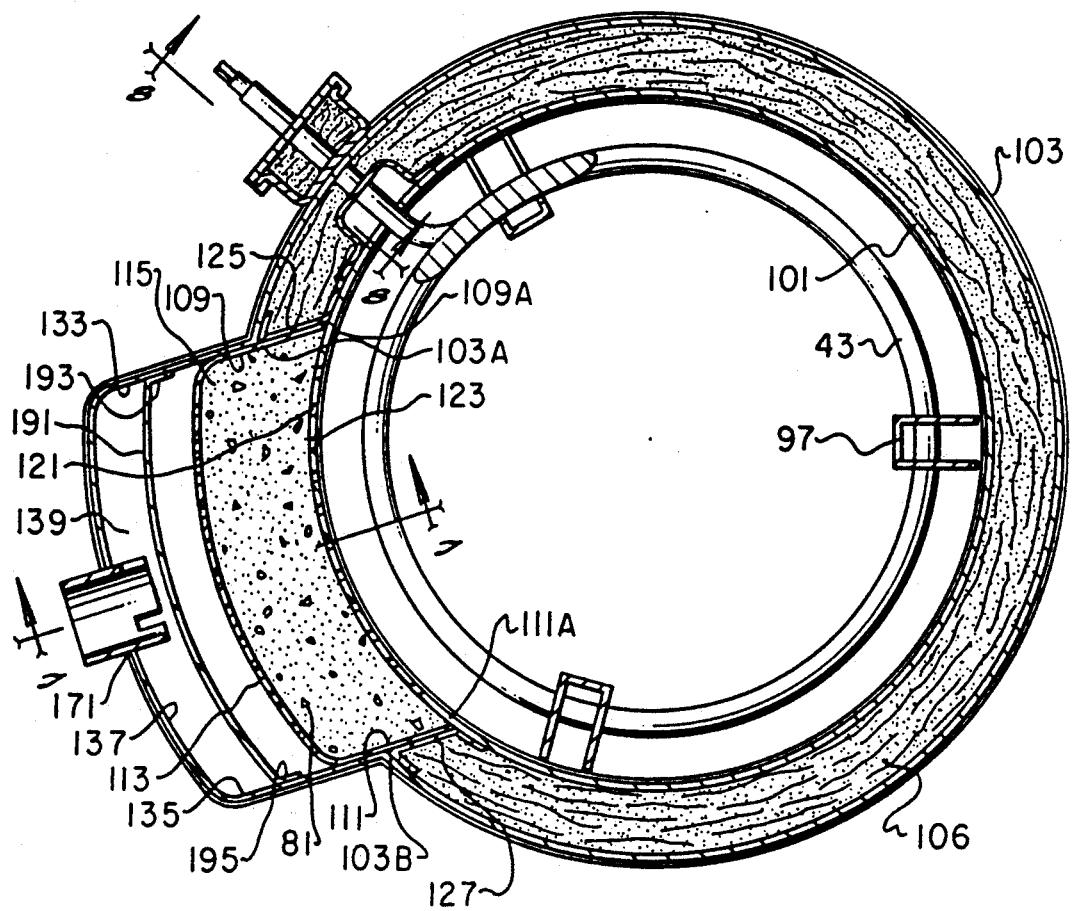
Figure 7:
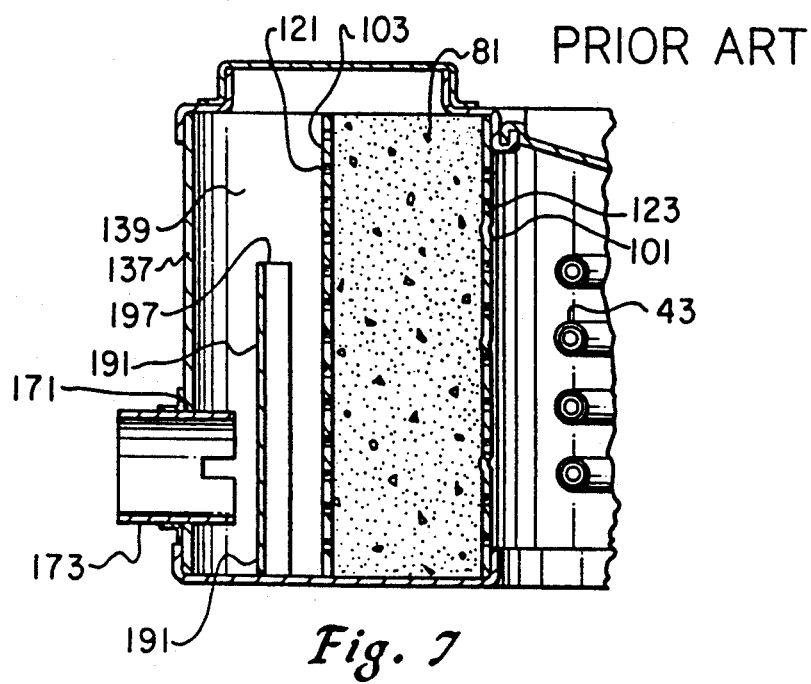

Referring now to FIGS. 1, 2, 4, and 7, the incinerator chamber member 41 is formed by a cylindrical shaped inner side wall 101 and a partially cylindrical shaped outer side wall 103 spaced from the partially surrounding the inner side wall 101 forming a partially annular heat insulation holding space 105 therebetween. The heat insulation is illustrated in FIGS. 1 and 4. A U-shaped outer catalyst chamber side wall 107 is coupled to the inner wall 101 and to the outer wall 103 for forming a catalyst chamber or container 109. The U-shaped member 107 has two legs 109 and 111 and an arcuate portion 113 having a radius greater than the radius of the wall 103. The edges 109A and 111B of the legs 109 and 111 are connected to the outer surface of the cylindrical member 101 and the outer sides of the legs 109 and 111 are connected to the edges 103A and 103B of the partially cylindrical shaped member 103 with the arcuate portion 113 extending outward beyond the outer wall 103 on one side of the diameter of the wall 103 forming a catalyst chamber 115 for receiving the heat activated odor reducing catalyst 81. Perforations 121 are formed through the arcuate portion 113 of the U-shaped member 107 and perforations 123 are formed through the cylindrical shaped inner wall 101 between the edges 109A and 111B of the legs of the U-shaped member 107. U-shaped brackets 125 and 127 are secured against the outside of the legs 109 and 111 and to the outside and the inside of the wall members 101 and 103 whereby the heat insulation chamber 105 and the catalyst chamber 107 are separated from each other. A second U-shaped wall member 131 having legs 133 and 135 and an arcuate shaped portion 137 is provided with the legs 133 and 135 being located against the outward portions of the legs 109 and 111 and with their edges 133A and 135A secured to the edges 103A and 103B of the outer wall member 103 such that the outer portion of the U-shaped member 131 including the arcuate shaped wall portion 137 extends outward of the wall portion 137 forming a collection chamber 139.

A top wall 141 comprising an annular wall portion 143 and an outward extending portion 145 is coupled to the upper ends of the wall members 101 and 103 and 107 and 131 and a bottom wall 151 comprising an annular wall portion 153 and an outward extending portion 155 is coupled to the lower ends of the wall members 101 and 103 and 107 and 131 to effectively seal the heat insulation chamber 105 from the catalyst chamber 115 and the collection chamber 139 and all of the chambers 105, 115, and 139 from the atmosphere. The outward extending portion 145 of the top wall 141 has an aperture 161 formed therethrough with a vertical wall 163 extending around the aperture and upward from the top portion of the wall portion 145 such that the aperture 161 is in fluid communication with both the catalyst chamber 115 and the collection chamber 139. A removable lid 165 is adapted to fit over the wall 163 and hence over the opening 161 and to be secured to the top wall 141 with bolts 167.

An exhaust port or opening 171 is formed through the wall portion 173 of the U-shaped member 131 at its lower end midway between its side walls 133 and 135. An exhaust tube 173 is located in the aperture 171 and an outlet chamber 181 has an inlet tube 183 located in the tube 173 and an outlet 185 located below the blower 161. A U-shaped baffle 191 has its lower end 192 secured and sealed to the inside of the outward extending portion 155 of the bottom wall 151 and its side legs 193 and 195 secured to the inside of the legs 133 and 135 of the U-shaped member 131. The top 197 of the baffle 191 is lower than the top wall 141 of the chamber member and above the exhaust port 171, 173. Thus, when the blower is operating, the gases from inside of the chamber member 41 and the ash pan 45 pass through the perforations 123, through the heat activated catalyst 81, through the perforations 121, above the top edge 197 of the baffle 191 through the exhaust port 171, 173 and into and through the exhaust chamber 181 by way of its inlet 183 and outlet 185 and then by way of the blower 161 through the exhaust vent 65.

The perforated section of the inner wall 101 has an arc length of about six inches and a height of about three and one-half inches. The height of the arcuate portion 113 also is about three and one-half inches. The distance between the perforated section of the cylindrical wall 101 and the arcuate portion 113 is about two inches such that the catalyst chamber has a total volume of about forty cubic inches. The collection chamber has a thickness from wall 113 to wall 137 is about one and one-quarter inches with an areal extent of six by four or twenty four square inches, having been reduced from ten by four or forty square inches of the earlier versions. Thus, the pressure distribution across the outer face of the perforated catalyst chamber is more nearly equalized because of the greater thickness and smaller area of the catalyst chamber. The catalyst is easily added through the port or opening 161 by removing the cap 163. Alternatively, old or deteriorated catalyst can be vacuumed out through the opening 161 which has dimensions of about one and one-quarter of an inch by four inches which is adequate for the nozzle of the ordinary home vacuum. Dust from the powdered catalyst generally accumulates in the lower portion of the catalyst chamber or container and is carried into the collection chamber along its lower level. The metal plate or baffle 191 is located midway between the walls 113 and 137 of the collection chamber and extends upward to a position about two thirds of the height of the collection chamber. The baffle 191 is sealed to the bottom 155 of the collection chamber. The baffle 191 thus causes dust to drop out and to be collected in the bottom in front of the baffle whereby the dust is prevented from entering the blower and depositing on the blower impeller. The collected dust can be vacuumed out from time to time.

Only a small portion of air drawn into the toilet goes into the incinerator chamber—only enough to permit complete incineration of the waste. Approximately ninety-five percent of the intake air traverses the space about the incinerator chamber thereby carrying away heat from the exterior incinerator wall.

Figure 9:
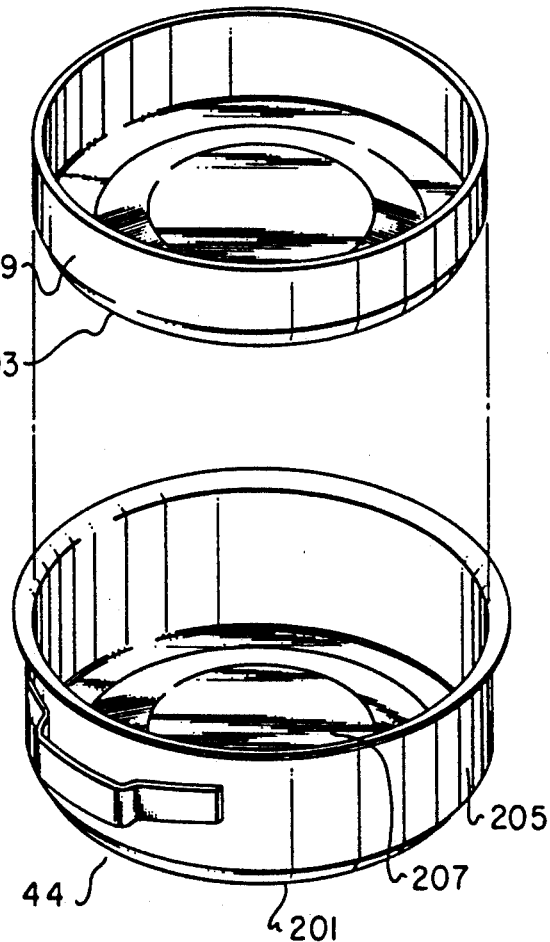
Figure 10:
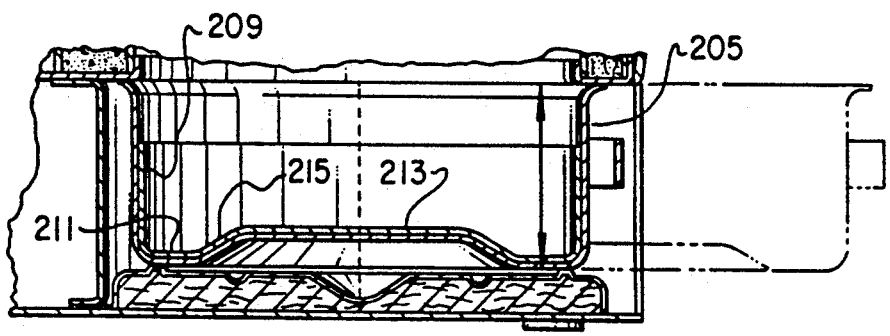

Referring to FIGS. 9 and 10, the ash pan 45 is a composite ash pan formed by an outer pan 201 of stainless steel and an inner or insert pan 201. The pan 45 is readily removed for emptying or replacement when needed at an inconsequential cost because of its simplicity of manufacture. The center portion of the inner pan 203 may be raised to close proximity to the heater 43 and yet readily conducts gathered heat to its lower portion for increased rate of evaporation of liquids accumulated in the bottom portion. In otherwords, the aluminum conducts heat into a portion not directly exposed to the radiant heat of the heater 43 itself. The outer pan 201 comprises an outer annular side wall 205 and a bottom wall 207. The inner pan 203 comprises an annular surrounding side wall 209, an annular lower wall portion 211 extending inwardly from the lower end of the annular surrounding side wall 209, and a raised portion 213 spaced inwardly of the annular surrounding side wall 209. The raised central portion comprises an annular inner side wall 215 extending upwardly from the annular lower wall portion 211 such that the annular inner side wall 215 is spaced from the annular surrounding side wall 209 with the raised portion 213 forming an upper platform connected to the upper end of the annular inner side wall 215. In the embodiment of FIGS. 9 and 10, the lower portion of the outer pan 201 is shaped similar to the lower portion of the inner pan 203 whereby the lower portion of the inner surface of the outer pan 201 and the outer surface of the inner pan 203 engage each other when the inner pan is inserted in the outer pan.

Figure 11:
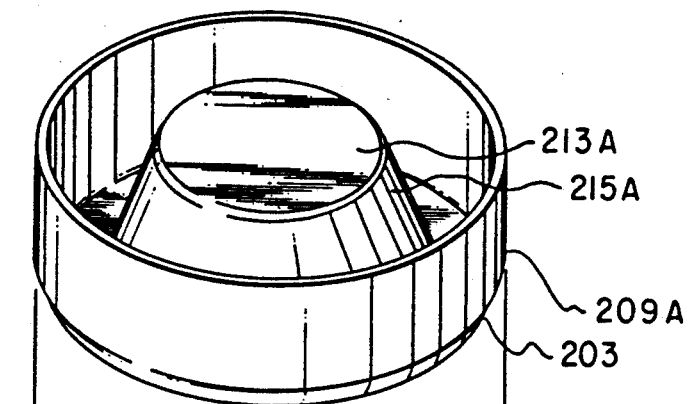
Figure 12:
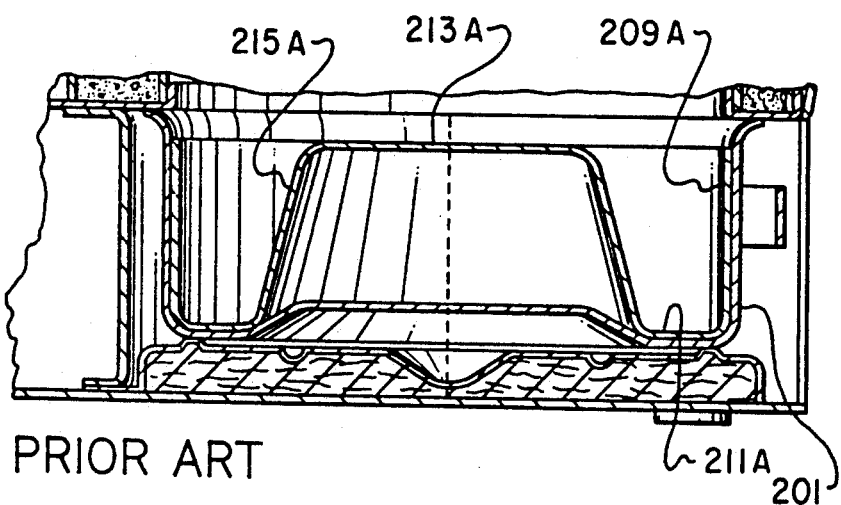

Referring to FIGS. 11 and 12, the outer pan 201 is the same as that of the outer pan of FIGS. 9 and 10. The inner pan 203 is modified in that its annular wall 209A is higher and the annular inner wall 215 is higher such that the upper wall 213A extends upward to about the same height as the upper edge of the wall 209A and both the upper wall 213 and the upper edge of the surrounding wall 209A extend to nearly the height of the upper edge of the outer pan 201. The outer surfaces of the walls 215A and 213A do not engage the bottom of the outer pan 201 and are spaced therefrom as shown in FIG. 12. In the embodiment of FIGS. 11 and 12, the platform 213A is raised substantially above the lower portion 211 of the inner pan whereby the solid portion of the human waste is separated from the liquid portion with the solid portion being deposited on the platform 213A and the liquid portion flowing to the lower portion 211A. Thus, the solids deposited on the platform 213A are maintained closer to the heater thereby decreasing the time of incineration and increasing the efficiency and lowering the amount of energy required. The liquids in the bottom portion 211A evaporate rapidly since the aluminum conducts heat into the lower portion 211A which may not be directly exposed to the radiant heat of the heater itself. Since the net or effective volume of the composite pan is reduced by virtue of the raised portion 215A and 213A, the height of the wall 209A is made approximately the same as that of the raised portion 215A and 213A to effectively increase the volume of the inner pan 203.

In one embodiment, the outer pan 201 is formed of 304 stainless steel. Pan 201 has a height of four inches and the outside diameter of wall 205 is ten inches. The wall thickness of pan 201 is 0.062 of an inch. The inner pan 203 is formed of a drawable aluminum such as 3003H14 aluminum. The wall thickness of the pan 203 is 0.125 of an inch. It is to be understood that the pans 201 and 203 may have different dimensions and formed of different variations of stainless steel and aluminum respectively.

Referring to FIGS. 3, 5, and 6, the arrangement for supporting the electrical heater coil 43 within the chamber 41 comprises three removable brackets 197 having hooks 197A formed at their upper ends. The brackets 197 have slots 197B adapted to receive the turns of the heater coil 43. The hook 197A of the brackets are inserted in slots 199 formed in the inside wall of the cylindrical member 101 for securing the brackets to the inside of the wall 101 while holding and supporting the electrical coil 43. The brackets 197 can be removed from the inner wall 101 to allow the coil 43 to be removed therefrom.

Figure 8:
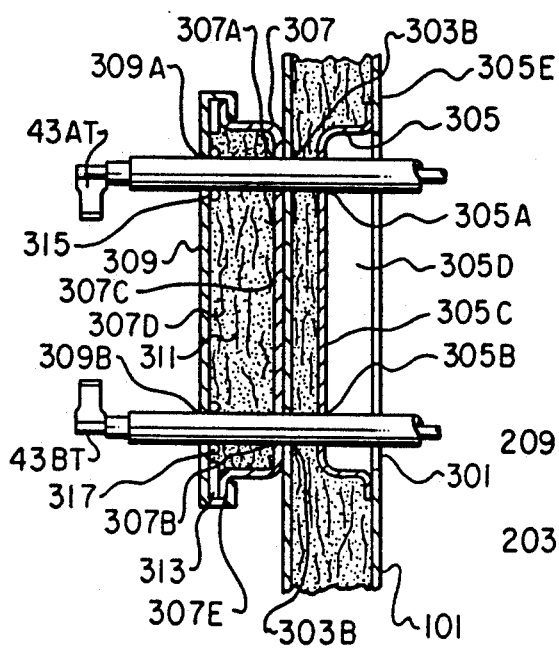

The coil 43 has two terminal ends 43A and 43B. Referring specifically to FIGS. 2 and 8 there will now be described an arrangement for facilitating the insertion of the terminal ends of the coil 43 through the inner and outer walls of the chamber 41 thereby facilitating removal and replacement of the coil for servicing. The terminal ends 43A and 43B have tabs 43AT and 43DT which are removed when the terminal ends are being inserted or removed from the chamber 41. A large rectangular shaped aperture 301 is formed through the inner wall 101 and two spaced apertures 303A and 303B are formed through the outer wall 103 on one side of the catalyst chamber as shown in FIG. 2. When the inner and outer members 101 and 103 are assembled, the apertures 303A and 303B will be in alignment with the large aperture 301. Also provided is an inner cup shaped member or pan 305 and an outer cup shaped member or pan 307. Member 305 has two small apertures 305A and 305B formed in its back end 305C and a large opening 305D surrounded by a flange 305E. The flange 305E is welded to the outer surface of the wall 101 such that the apertures 305A and 305B are in alignment with the apertures 303A and 303B respectively and such that the opening 305D is in alignment with the opening 301. Pan 307 also has two small apertures 307A and 307B formed in its back end 307C and a large opening 307D formed in its front end and surrounded by a flange 307E. Opening 307D is adapted to be closed by a lid 309 which may be attached to the flange 307E as shown in FIG. 8. The back end 307C is welded to the outside surface of the outer wall 103 such that apertures 307A and 307B are in alignment with apertures 303A & 303B. The lid 309 has a pair of small apertures 303A and 303B for receiving the terminal ends 43A and 43B of the coil. Located within the pan 307 is heat insulation material 311 which may be hair-like mineral wool.

When assembling the heater coil in place, the lid 109 will be removed. The heater coil then will be located within the slots 197B of the brackets 197 such that the brackets 197 are located 120 apart. The coil and the brackets then will be tilted as the assembly is inserted in the interior of the chamber 41 to allow the terminal ends 43A and 43B to be inserted through the large aperture 301; through the smaller aperture 305A, 303A, 305B, and 303B, 307A, 307B; and then out through the large opening 307D of the pan 307. The heat insulation 311 then may be inserted within the pan 307 and packed around the terminal ends after which the lid 309 may be inserted in place. Suitable heat resistant flexible seals 313, 317, 315, and 317 may be provided to insure minimum of heat loss through the sealing pan 307.

In one embodiment, the walls 101, 103, 107, 131, and 137 and 151 and 141 of the chamber 41 may be formed of suitable mild steel. The heat activated catalyst 81 may be aluminium oxide (Al₂O₃) pellets although it is to be understood that other types of heat activated catalyst may be used or mixed with the aluminum oxide. The heat insulation material 106 located in the chamber 105 may be mineral wool.

DESCRIPTION OF THE PREFERRED EMBODIMENTS

Figure 13:
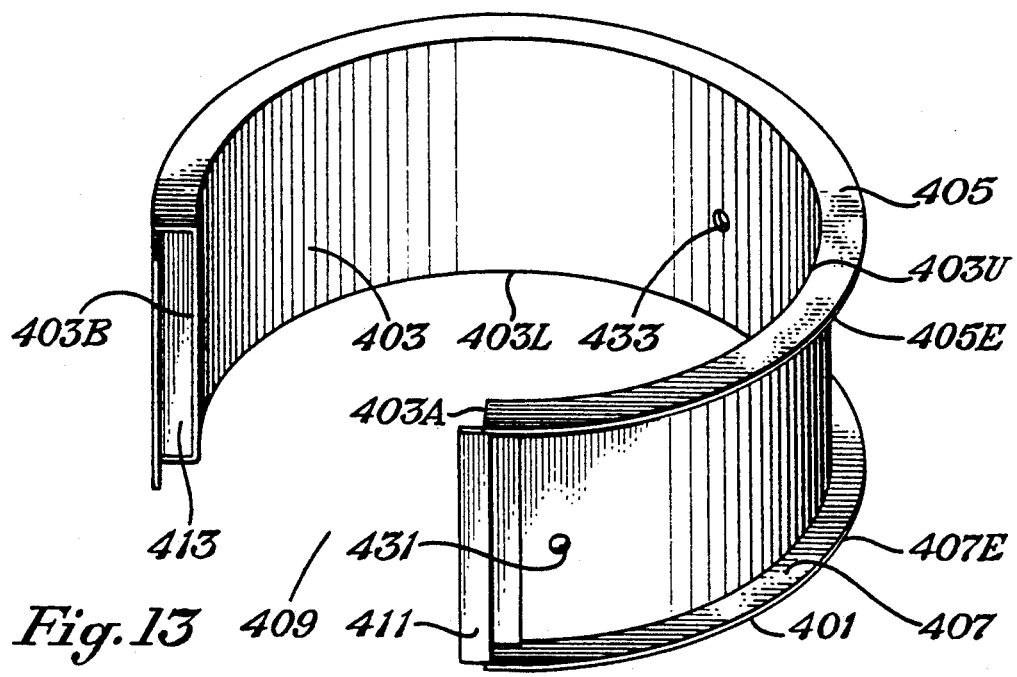
FIG. 13 is an isometric view of an inner chamber portion of the invention.
Figure 14:
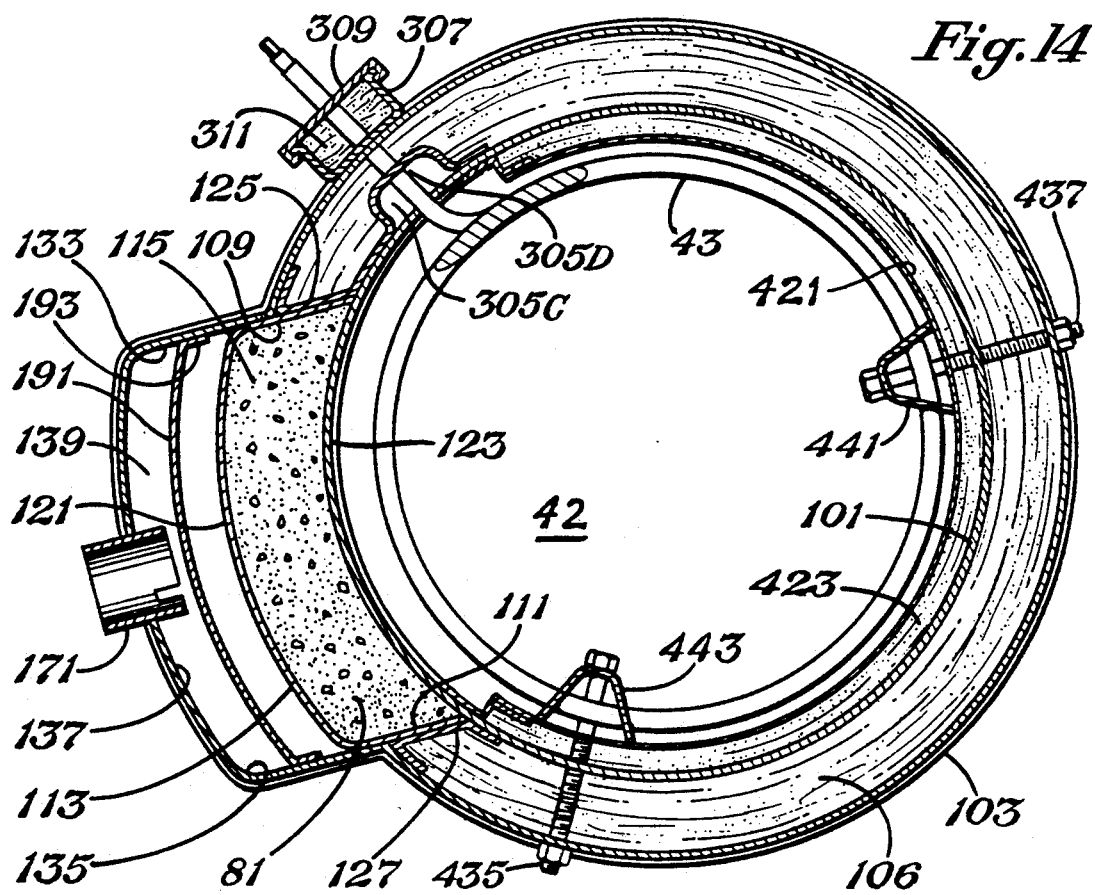
FIG. 14 is a plan view of the incinerator toilet of the invention with the chamber of FIG. 13 located therein.

Referring now to FIGS. 13 and 14 there is disclosed a partially cylindrical shaped chamber member 401 for use in the incinerator toilet of FIGS. 1-8. In FIG. 14 like reference numerals identify the same components disclosed in FIGS. 1-8. The inner cylindrical wall 101 is fixed in diameter and has maximum diameter of that associated with maximum heater size, i.e., wattage. The diameter of the chamber member 401 will vary with the size and wattage of the heater coil 43. Member 401 comprises a partially cylindrical shaped inner wall 403 having upper and lower flanges 405 and 407 extending radially outward from the upper and lower ends 403U and 403L such that the outer edges 405E and 407E will engage the inside of wall 101 when the member 401 is located in the opening 42 with the inside of wall 403 being spaced outward from the coil 43. The ends 403A and 403B of the wall 403 are spaced apart forming a gap 409. End walls 411 and 413 are secured to the ends 403A and 403B such that when the chamber member 401 is located in the opening 42, the flange edges 405E and 407E and the end walls 411 and 413 will engage the inside of wall 101 and form an enclosed chamber 421 between wall 403, flanges 405 and 407, end walls 411 and 413, and wall 101 in which heat insulation material 423 is located. Material 423 is the same as material 106. The components of the chamber 401, 403, 405, 407, 411, and 413 may be formed of mild steel and the edges 405E, 407E and walls 411 and 413 may be tack welded to the wall 101 in the position shown in FIG. 14 such that the ends 403A and 403B straddle the arc of the wall 101 through which the perforations 21 are formed and also the pan 305.

Two apertures 431 and 433 are formed through the wall 403 and apertures are formed through walls 101 and 103 in alignment with apertures 431 and 433 for receiving two bolts 435 and 437 for holding two brackets 441 and 443 for supporting the coil 43.

In one embodiment the inside diameter of wall 101 is 9¾ inches. This is the maximum size for a heater coil 43 having an outside diameter of 9 inches and which produces 4000 watts. In this embodiment, the chamber 401 will not be used.

If however, a heater coil wattage of 1800 watts is desired, the chamber 401 will be used. In this embodiment, the coil 43 will have an outside diameter of 8½ inches and the radial dimensions of each of the flanges 405 and 407 will be ½ of an inch such that the inner wall 403 will be located close to the coil 43.

Figure 15:
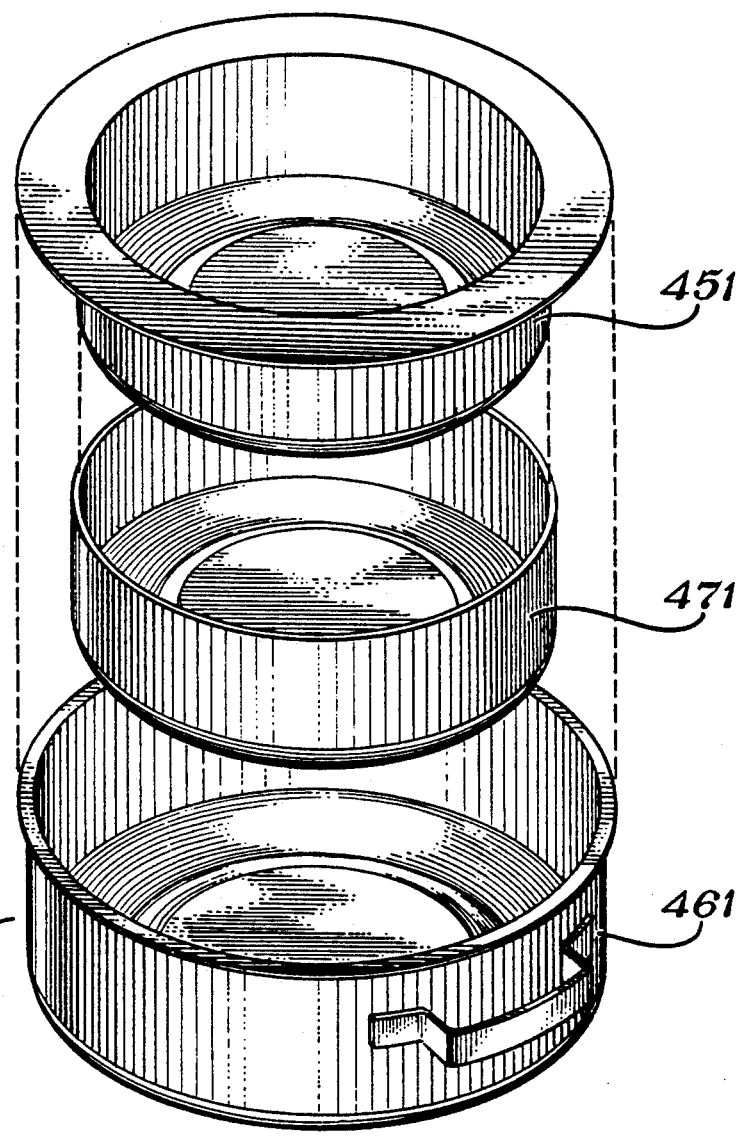
FIG. 15 is an exploded view of the ash pan of the invention.
Figure 16:
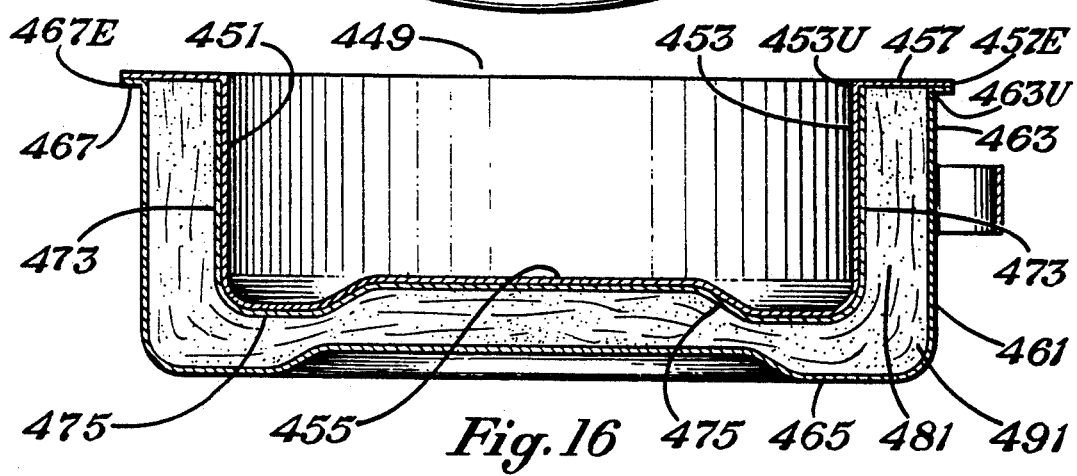
FIG. 16 is a cross-sectional view of the pan of FIG. 15 with the ash pan in an assembled condition.

Referring to FIGS. 15 and 16 the ash pan 449 of the invention comprises inner and outer stainless pans 451 and 461, an intermediate copper pan 471 and heat insulation material 481. The pan 451 comprises an annular side wall 453 and a bottom 455 with a radially extending lip or flange 457 extending outward from the upper end 453U. The pan 461 comprises an annular side wall 463 and a bottom 465 with a lip 467 extending radially outward from the upper end 463U. The pan 471 comprises an annular wall 473 and a bottom 475.

In assembling the ash pan 449, the inside of pan 471 is placed against the outside of pan 451 and compressible heat insulation 481 is inserted in the pan 461 against its bottom 465 and side 463 and pans 451 and 471 are located in the pan 461 against the insulation 481. The compressible nature of the insulation 481 forces the copper pan 471 to hug the pan 451. The heat insulation 481 may be compressible mineral wool.

Once the three-pan composite is assembled, the system is sealed by welding together the outer edges 457E and 467E of the two stainless pans 451 and 461, producing an hermetically sealed system.

To overcome the problem of oxidation of the copper at high temperatures, two holes diametrically opposed are drilled in the side walls of the outer stainless steel pan 461. The ordinary air trapped within the space 491 between the outer pan and inner copper pan is replaced by an inert gas, e.g., argon, by blowing it into one hole with air coming out the other hole. This is done until all of the air is removed. Both holes then are sealed by welding.

If the inert gas or vacuum is not employed, the desired effect may also be brought about by producing a vacuum within the space 491 only limited and acceptably low oxidation may occur since the amount of oxygen within annulus space 491 is definitely limited.

In one embodiment, the inside diameter of the annular side wall 453 of the inner pan 471 is 8 inches and the inside diameter of the annular side wall 463 of the outer pan 461 is 9½ inches. The outside diameter of each of flanges 457 and 467 is 11¼ inches. The inner and outer stainless steel pans 451 and 461 are each 22 gauge 304 stainless steel. The copper pan 471 is 20 gauge fully annealed copper.

Figure 17:
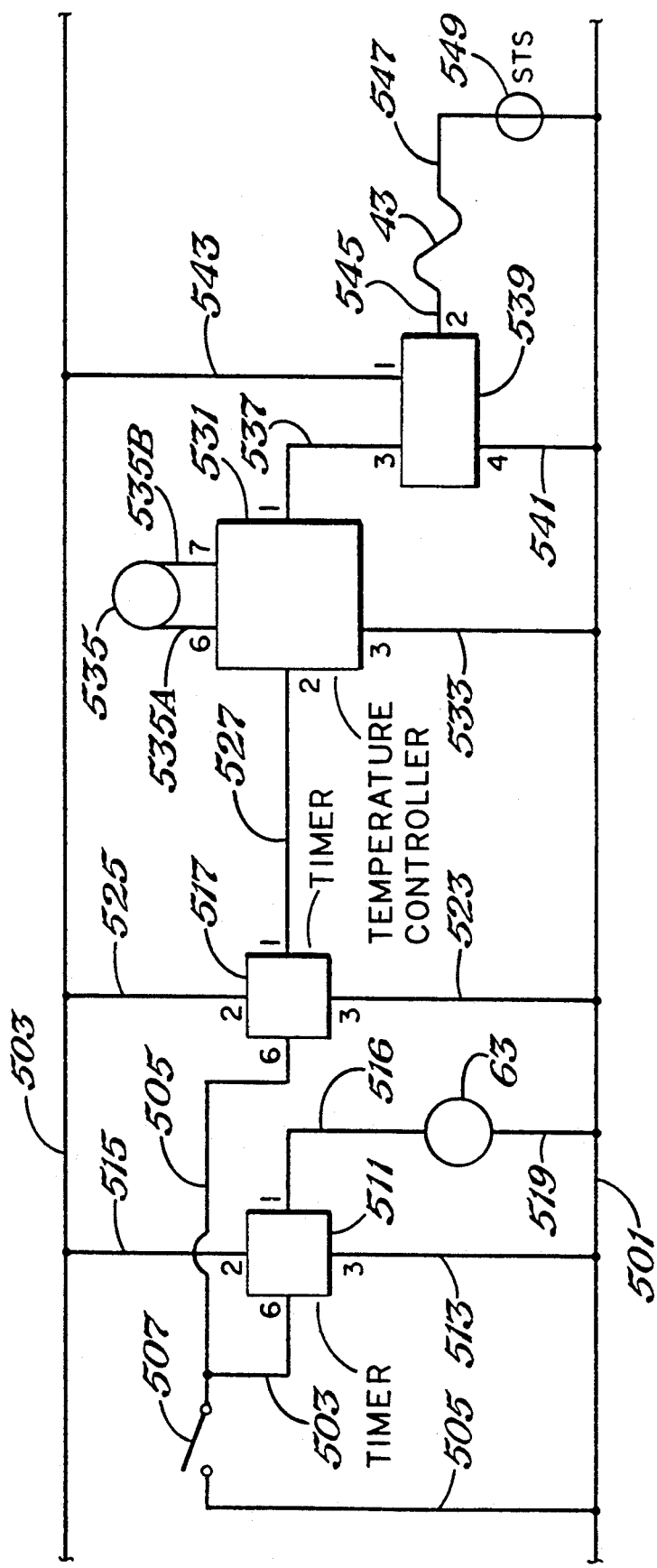
FIG. 17 is an electrical schematic of the circuit of the invention.

Referring now to FIG. 17, there will be described the circuit of the invention for controlling the motor 63 of the blower fan and the heater element 43 and also the temperature of the heater element 43. The circuit comprises two power leads 501 and 503 with power lead 501 being the hot lead. Solid state timer 511 is provided for controlling the timing of the fan motor 63 and solid state timer 517 is employed for controlling the timing of the heater element 43. Timer 517 controls a temperature controller 531 to which is coupled a thermocouple 535 which is located next to or in contact with the heater element 43. The temperature controller is a solid state device and it controls a solid state relay 539 which is coupled to the heater element 43. Both of the timers 511 and 517 have terminals 1, 2, 3, and 6. The temperature control 531 has terminals 1, 2, 3, 6, and 7.

There are three basic functions to control; first the heater surface temperature; second the time cycle for incineration; and third the time cycle for exhausting and cooling. The two time cycles start simultaneously, i.e., the exhaust means starts with the heating means and continues throughout the heating cycle and continues after the heating cycle has ceased until some lower incinerator temperature has been attained. During the heating or incineration cycle, the heater surface temperature must be controlled to limits as mentioned above.

There are two basic circuits, each containing a solid state timer; timer 511 controls the blower circuit. Timer 517 drives the temperature controller 531 which in turn drives the solid state relay 539 which controls electric current to the heater 43. The temperature controller is "on" until the thermocouple senses a temperature of 1400 F. at which point it causes the controller to temporarily shut down the relay and, therefore, heater. When the temperature decreases, the thermocouple allows the controller to drive the relay 539.

The physical arrangement of the thermocouple in relation to the heater creates a temperature lag between actual and sensed temperatures. Thus, the thermocouple will allow the temperature to fall, i.e., 200 F before it senses that it should be closed. In effect, then, actual temperature limits of control for a given setting on the temperature controller may range between 1200 F and 1400 F.

If timer 517 is set for X minutes, then during the interval of X minutes, the heater 43 will be on "unless shut down by temperature controller 531" and other then the time required to obtain temperature, will range between 1200 F and 1400 F.

If the timer 511 is set for X+60 minutes, for example, then the system will have reached a lower, safe temperature, i.e. 120 F.

If both timer circuits are activated simultaneously, the desired function is achieved.

Referring to the details of FIG. 17, the terminal 6 of timer 511 is connected to lead 501 by way of lead 505 and switch 507. In addition, the input terminal 6 of timer 517 is connected to lead 501 by way of lead 505 and switch 507. Terminals 2 and 3 of timers 511 and 517 are connected leads 503 and 501 by way of leads 515, 513 and 525, and 523 respectively. The terminal 1 of timer 511 is connected to the fan motor 63 by way of lead 516 and the motor 63 is connected to lead 501 by way of lead 519. The terminal 1 of timer 517 is connected to terminal 2 of the temperature control 531 by way of lead 527. Terminal 3 of temperature controller 531 is connected to power lead 501 by way of lead 533. The thermocouple 535 is connected to terminal 6 and 7 of the temperature controller by way of leads 535A. and 535B. The terminal 1 of the temperature controller 531 is connected to terminal 3 of relay 539 by way of lead 537 and terminal 4 of relay 539 is connected to power lead 501 by way of lead 541. The terminal 2 of relay 539 is connected to the heating element 43 by way of lead 545 and the other side of the heating element 43 is connected to power lead 501 by way of lead 547 and a safety thermostat 549 which shuts down the heater in the event of a blower failure and after sensing the upper temperature limit. Terminal 543 of relay 539 is connected to power lead 503 by way of lead 543.

All three solid state devices, the two timers 511 and 517 and the temperature controller 531 have voltages applied across connections 3 and 2 with the power outputs from all three devices applied between terminals 1 and 3. A momentary pulse, caused by closing switch 507, through terminals 6 of timers 511 and 517 causing an internal switch within each device to close, thereby creating a connection between or across terminals 3 and 1. Power will appear across terminals 3 and 1 and will continue to appear until the timing intervals are completed.

The timer 511, once initiated by the application of a pulse to terminal 6, applies voltage to the fan motor 63 by way of terminals 3 and 1. The fan will stay on until the timing interval of timer 511 has elapsed.

The timer 517 simultaneously applies power to the temperature controller 531 by way of terminals 3 and 1. In this case, terminals 6 and 7 sense the voltage developed by the thermocouple 539 physically contacting the electric heater 43. As long as the temperature is below some predetermined value, the thermocouple output will be below that necessary to balance an internal circuit of the controller so that the output across terminals 3 and 1 continues and the relay coil terminals 3 and 4 also continue to maintain closed the relay terminals 1 and 2 and the heater is actuated to heat until the thermocouple senses a shut down temperature. The action continues until such time that the timing interval supplied by the timer 517 has elapsed.

For practical purposes, as outlined above the timing interval of timer 511 is always longer than that of timer 517.

Figure 18:
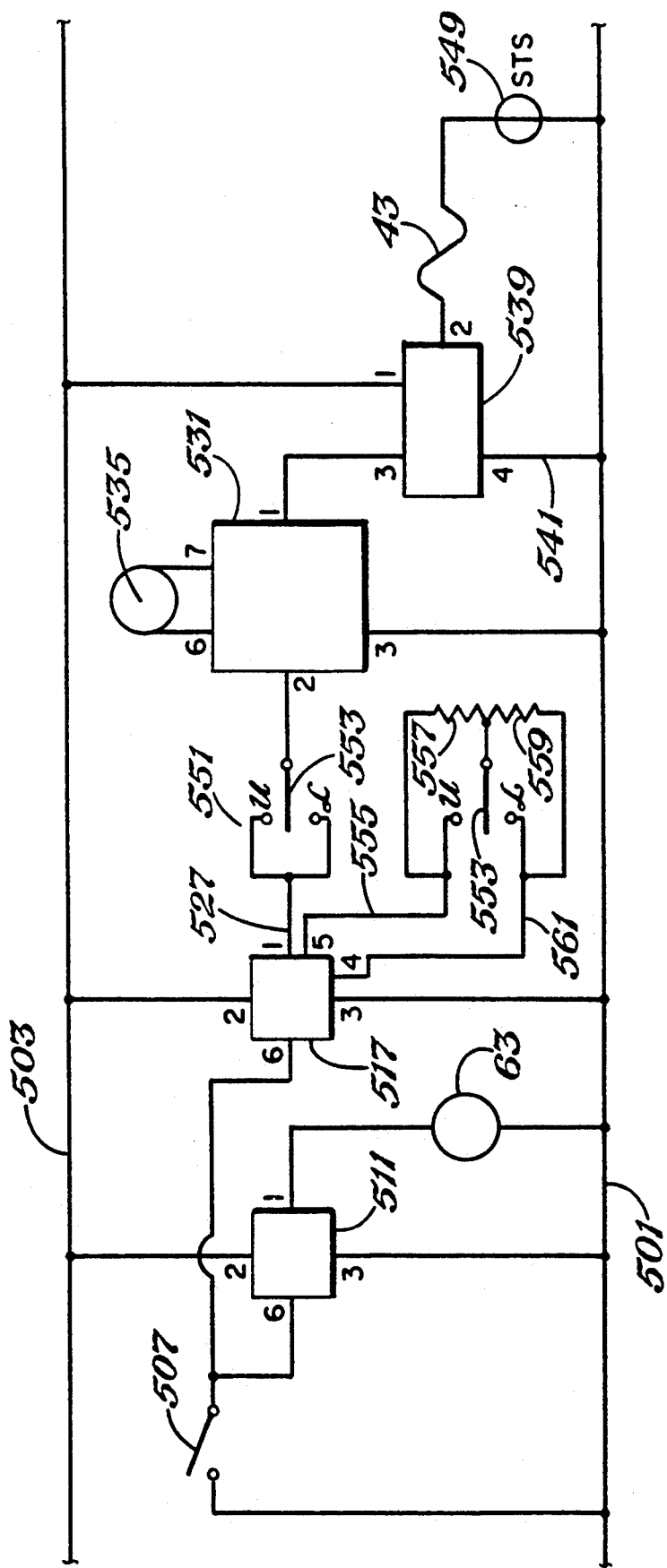
FIG. 18 is an electrical schematic of the circuit of FIG. 17 with a selector switch included therein.

Referring to FIG. 18, there are disclosed modifications of the basic circuitry of FIG. 17 which makes the operation of the incinerator toilet more efficient and more desirable from the user perspective. As an example, consider that a toilet is used for both solids and urine deposits but not always simultaneously. Therefore, different length incineration cycles are needed in order to conserve energy: longer for solids and shorter for urine deposits.

There may be times when the user wishes to use the toilet yet delay the actual incineration until sometime later, e.g., using the toilet at night and incinerating the next day. In addition, the user may wish to activate the blower only without the incineration process. In the latter case, a separate on/off switch can be provided. For the former case a multi-station switch can be used.

For applications where the user is not familiar with this type of toilet, the simplest control is the best, namely providing one timing interval setting to insure that all waste is incinerated regardless of the amount or type. Industrial sites are a typical example.

If, however, the owner and user of the toilet happens to be the same person, control methods can be provided whereby the user can choose which interval of incineration is needed, e.g., short time for incineration of urine deposit only and longer intervals for incineration of solids or for the incineration of accumulated waste such as during early mornings. He may wish to operate the blower only.

The switching system for accomplishing that purpose is provided by switch 551 which includes the switch element 553 and switch element 563 which move together. Terminal 1 of timer 517 is connected by way of lead 527 to two terminals U and L. The switching element 553 is coupled by way of lead 527 to terminal 2 of the temperature controller 531. Terminals 4 and 5 of the timer 517 are coupled by way of leads 555 and 561 to terminals U and L and to resistors 557 and 559. The switching element 563 is connected between resistors 557 and 559.

The addition thus of the double pole, double throw switch having an off position in the middle supplies the needed flexibility. With switching elements 553 and 563 and U-positions, the timer 517 sees the resistance of resistor 599 between its 4 and 5 terminals; in the L-positions, it sees the resistance of resistor 557. However when the switching element 553 is open (also switching element 563 is open), a voltage is prevented from appearing at terminal 2 of the controller 531 and the relay 539 does not supply current to the heater. By proper selection of the switch position, the user may select a short or long burn cycle or venting only, depending upon his needs.

Technically, the timing interval for either timers 511 and 517 is determined by the amount of ohmic resistance between terminals 4 and 5 of the timer. If the interval is always fixed in length, the resistance is usually embedded within the plastic body of the timer. If flexibility in choosing the timing interval is needed, then the resistance can be made external and changed as required. Switching element 563 and resistors 557 and 559 do exactly this, providing two different resistance, selectively available to the user. The longer cycle needs a greater resistance and the shorter cycle needs a lower resistance.

Examination of the circuitry would seem to indicate that once started, the timer 517 would continue to count until that time interval associated with the combined resistance 557 and 559 is timed out; however, the timing circuit is interrupted at the instant terminal 1 of timer 517 and terminal 2 of the controller 531 is broken by switching element 553 taking the middle position. The mechanism of the timer is such that it must have a load across its terminal 1 and if not, the timer shuts down. Timer 517 is therefore, rendered inactive immediately when the middle position of the switching element 553 is assumed.

Generally for the timers, the resetting of timer 517 will occur if the load disappears across the controller, i.e., switch 553 is in the off or center position. This however has not been found always to be the case in that one batch of timers might exhibit the characteristic of not resetting, hence, continuing supply power to the heater if the switch 553 is returned to the U or L positions. If the timer 511 has a time interval smaller than the time interval timer 517 associated with 557 and 559 resistances in series the timer 517 terminals 4 and 5 (the case in which switch 553 is in the center position), and switch 553 has been in the center position for some time, i.e. blower only on, then the switch is thrown either up or down to terminals U or L, it is possible that the heater might come back on and stay on as the timer 511 resets and the blower goes off which is not a good condition.

In order to solve the problem, the switching element 553 and its terminals U and L may be moved to connect the terminals U and L to the terminal 2 of the timer 517 and switching element 553 to the power lead 501. In this case, the timer 517 will be off definitely when the switch 553 is in the open or center position and will not restart until the start switch has been closed again.

Figure 19:
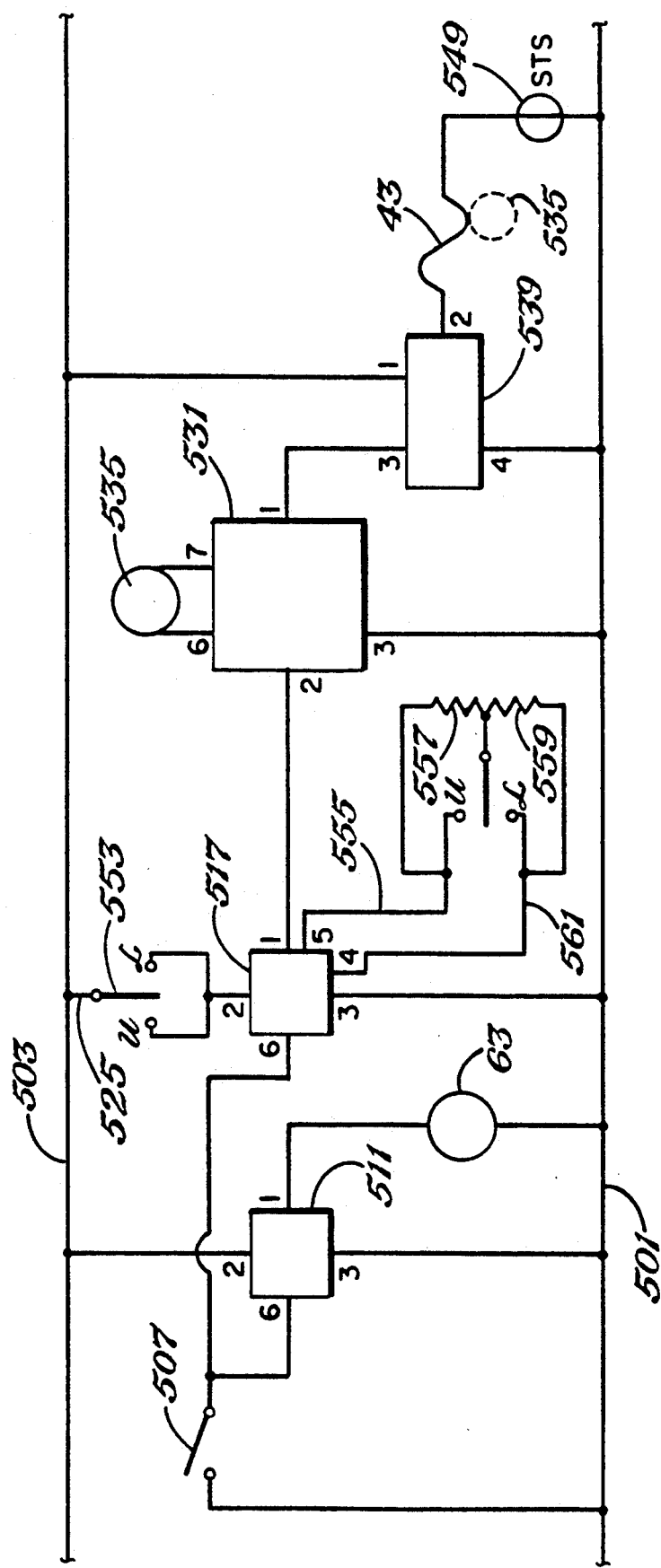
FIG. 19 is a modified electrical schematic of the circuit of FIG. 18 with a portion of the selector switch located in a different position.

In one embodiment, the thermocouple 535 may be an iron-constantan type or a chromel-alumel type. Preferably it will engage the heater as illustrated in dotted form in FIG. 19. The temperature controller 531 may be a TCKIA,K manufactured by Syrelec. The timers 511 and 517 each may be a PJ504 manufactured by Syrelec and having selectable timing durations of 60, 90, and 120 minutes.

It is an advantage to provide a variable length of heater-on time such that the incineration process continues until all waste is incinerated but not beyond the time required for incineration, i.e., the heater is on and power is consumed for that precise time required to incinerate that particular waste deposit and no more. Not only is energy conserved but the capacity of the system is enlarged since no unneeded time is assigned to the incineration cycle.

Figure 22:
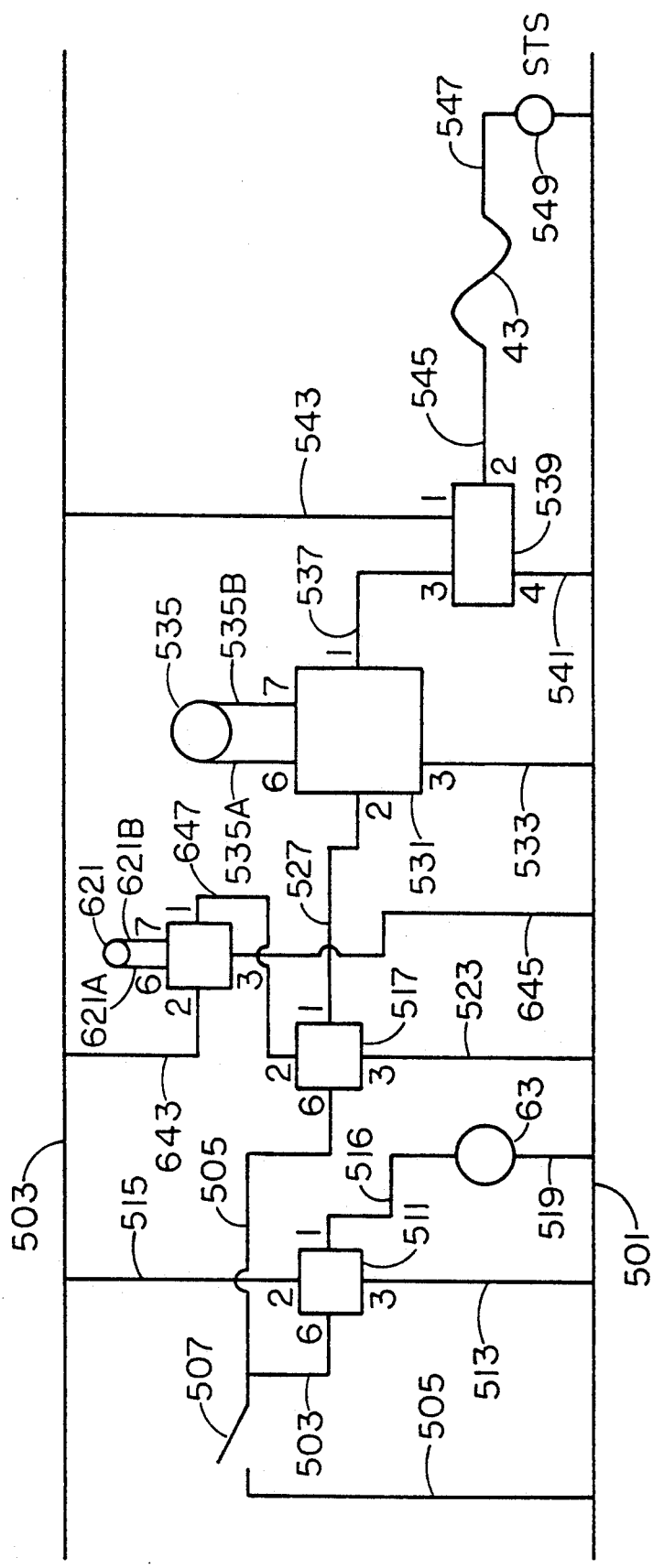
FIG. 22 is an electrical schematic of FIG. 17 modified with the thermocouple of FIGS. 20 and 21 and a second temperature controller employed.

Referring to FIGS. 20–22 there will be described a system for controlling the heater for causing it to turn off after the incineration process is complete. In these Figs. the same reference characters identify the same components as described with respect to FIGS. 1–19. A metal cylindrical tube 601 having a sealed end 603 extends into the space 491 of the ash pan 449 from the annular side wall 463 of pan 461 to about the middle or somewhat beyond of the space 491 between the bottom 465 of the steel pan 461 and the bottom 475 of the copper pan 471. The tube 601 has an open end 605 which is welded to an annular fitting 607 having a smaller diameter circular hole 609 formed therethrough. The side wall 463 has a circular hole 611 formed therethrough near the bottom 465 for receiving the tube 601. The tube 601 is inserted through the hole 611 into the space 491 until the fitting abuts against the wall 463 and the fitting 607 and the end 605 of the tube are welded to the wall 463 such that the inside 602 of the tube 601 is sealed from the space 491 and access to the inside of the tube 601 can be had only from the outside of the pan 461 through the opening 609 of the fitting 607.

An elongated annular thermocouple 621 is provided having a size such that it can pass through the hole 609 of the fitting 609 and into the inside 602 of the tube to a position such that its end 623 is located near the end wall 603 of the tube 601. Thermocouple 621 is of the same type as thermocouple 535. The thermocouple 621 closely fits in the hole 609 of the fitting 607 such that air from the outside cannot freely circulate within the tube 601 itself; i.e., the measured temperature at the bottom of the ash pan is not affected by air circulation from outside.

The other end 625 of the thermocouple 621 is rigidly secured to the support 44 of the incinerator chamber such that as the ash pan is withdrawn for servicing, the thermocouple 621 remains in place, fixed to the incinerator chamber structure.

As the ash pan is returned to its in-place position the thermocouple 621 extends through fitting hole 609 into the inside 602 of the tube 601. Although not shown, guides will be provided to insure that the thermocouple 621 will always be inserted through fitting hole 609 into the inside 602 of the tube 601 as the ash pan is returned to its in-place position.

As shown in FIG. 21, the support 44 has a hole 631 formed therethrough for receiving the end 625 of the thermocouple 621 which has threads 627. Nuts 633 and 635 are screwed to the threads 625 and against the support 44 for securing the thermocouple 621 to the support 44.

A temperature controller 641 is provided which is of the same type as controller 531. Controller 641 has its terminal 2 connected to power lead 503 by way of lead 643; its terminal 3 connected to power lead 501 by way of lead 645; and its terminal 1 connected to terminal 2 of timer 517 by way of lead 647. The leads 621A and 621B of thermocouple 621 are connected to terminal 6 and 7 of controller 641 such that at some specified temperature, the output at its terminal 1 opens(terminates).

Since the terminal 2 of controller 641 is always powered from power lead 503, there is always an output at its terminal 1 except during that interval in which temperature as measured below the copper pan 471 is above some predetermined value, i.e. 900 F. Thus when the toilet is first used, both timers are initiated; the blower comes on, the heater comes on and stays on, at least intermittently as interrupted by thermocouple 535, until either heater timer runs its course and cuts off or thermocouple 621 senses 900 F. and terminates the output at terminal 1 of thermocouple 641 which in turn interrupts power to the heater timer 517 to shut down the heater 43. Once the heater timer 517 is cut off, it stays off until it is reactivated by the next user closing start switch 507.

As long as there is waste in the ash pan, the temperature as sensed by thermocouple 621 will be below the predetermined value, i.e. 900 F. As incineration continues, the temperature in the ash pan will increase until it reaches the predetermined value, i.e. 900 F. which has been determined from prior experience to indicate that there is no more waste in the ash pan to incinerate.

I claim:

1. A circuit for controlling a blower and a heater of an incinerator toilet comprising:
    first and second electrical timers coupled to said circuit
    each of said timers having an input terminal and an output terminal wherein the timer produces an electrical output when the output terminal is coupled to an electrical load and an electrical input is applied to the input terminal,
    an electrical blower fan coupled to the output terminal of said first timer and to said circuit,
    an electrical temperature controller coupled to said circuit and having an input terminal and an output terminal,
    an electrical heater coupled to said circuit,
    an electrical relay coupled to said circuit and having an input terminal coupled to the output terminal of said temperature controller and an output terminal coupled to said electrical heater,
    a thermocouple coupled to said temperature controller for controlling said temperature controller,
    means for coupling the output terminal of said second timer to the input terminal of said temperature controller,
    switch means coupled to said circuit for simultaneously applying electrical energy to the input terminals of said first and second timers for actuating said first and second timers and hence said blower fan and said temperature controller to allow said temperature controller to actuate said relay to apply electrical energy to said electrical heater,
    said first timer having a longer timing duration than said second timer whereby said blower fan will continue to operate for a given time duration after said second timer times out,
    said thermocouple sensing the temperature of said electrical heater to control said temperature controller during the time that said second timer is actuated.

2. The circuit of claim 1, comprising:
    a selector switch coupled to said circuit for controlling said second timer,
    said selector switch being movable to first, second, and third position, for terminating the output said second timer; for increasing its timing interval; and for decreasing its timing interval.

* * * * *